(12) United States Patent
Comte

(10) Patent No.: US 7,473,660 B2
(45) Date of Patent: Jan. 6, 2009

(54) β-QUARTZ AND/OR β-SPODUMENE GLASS CERAMIC

(75) Inventor: Marie Jacqueline Monique Comte, Fontenay aux Roses (FR)

(73) Assignee: Eurokera, Chierry (FR)

( * ) Notice: Subject to any disclaimer, the term of this patent is extended or adjusted under 35 U.S.C. 154(b) by 75 days.

(21) Appl. No.: 11/637,557

(22) Filed: Dec. 12, 2006

(65) Prior Publication Data

US 2007/0129231 A1  Jun. 7, 2007

(51) Int. Cl.
*C03C 10/12* (2006.01)
*C03C 10/14* (2006.01)

(52) U.S. Cl. .............................................. 501/4; 501/7
(58) Field of Classification Search .................... 501/4, 501/7
See application file for complete search history.

(56) References Cited

U.S. PATENT DOCUMENTS

| 6,930,289 | B2 | 8/2005 | Siebers et al. | |
|---|---|---|---|---|
| 7,091,141 | B2* | 8/2006 | Horsfall et al. | 501/4 |
| 7,199,066 | B2* | 4/2007 | Horsfall et al. | 501/67 |
| 7,216,510 | B2 | 5/2007 | Doehring et al. | |
| 7,285,506 | B2* | 10/2007 | Horsfall et al. | 501/7 |
| 2004/0198579 | A1* | 10/2004 | Horsfall et al. | 501/4 |
| 2005/0250639 | A1 | 11/2005 | Siebers et al. | |
| 2005/0252503 | A1 | 11/2005 | Siebers et al. | 126/1 |
| 2007/0004578 | A1* | 1/2007 | Monique Comte | 501/4 |
| 2007/0213192 | A1* | 9/2007 | Monique Comte et al. | 501/7 |
| 2007/0281849 | A1* | 12/2007 | Yagi et al. | 501/4 |
| 2007/0293386 | A1* | 12/2007 | Goto | 501/4 |

FOREIGN PATENT DOCUMENTS

| EP | 0823404 | A2 | 2/1998 |
|---|---|---|---|
| EP | 1 391 433 | A2 | 2/2004 |
| EP | 1 593 658 | A1 | 11/2005 |
| WO | 2002016279 | A1 | 2/2002 |
| WO | WO02/16279 | A | 2/2002 |

* cited by examiner

*Primary Examiner*—Karl E Group
(74) *Attorney, Agent, or Firm*—Siwen Chen; Michael Russell

(57) ABSTRACT

The present application discloses: (i) novel glass-ceramic materials containing a solid solution of b-quartz or of β-spodumene as main crystalline phase(s); (ii) articles made from said novel glass-ceramic materials; (iii) lithium alumino-silicate glasses, precursors of such novel glass-ceramic materials; and (iv) methods for preparing the aforesaid novel glass-ceramic materials and the aforesaid articles made of said novel glass-ceramic materials. The present invention relates to the use of $SnO_2$ (0.15 to 0.3% by weight) and $CeO_2$ and/or $MnO_2$ (0.7 to 1.5% by weight), as an agent for fining the glass-ceramic material glass precursor.

8 Claims, 1 Drawing Sheet

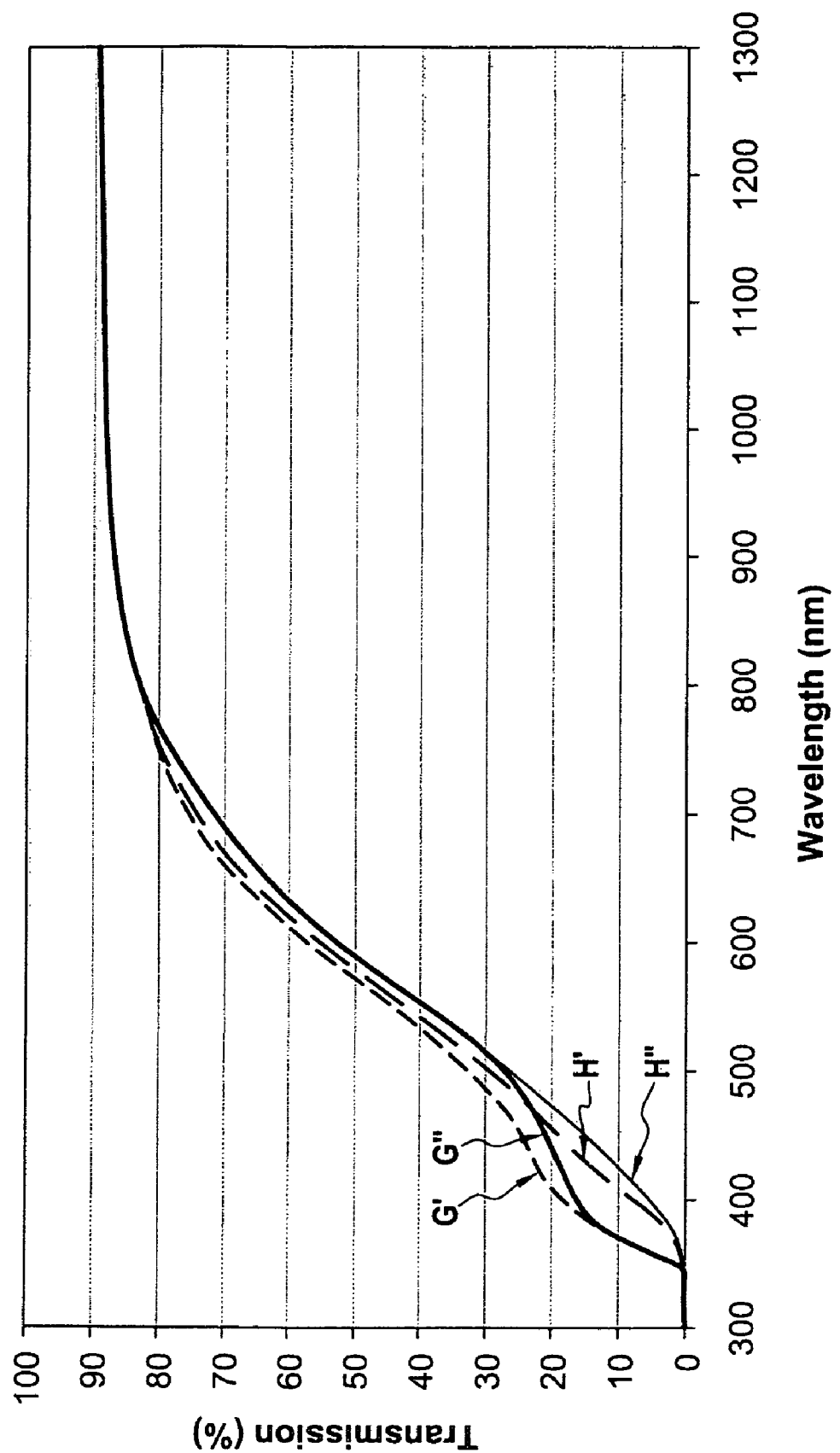

β-QUARTZ AND/OR β-SPODUMENE GLASS CERAMIC

FIELD OF THE INVENTION

The present invention relates to glass and glass-ceramic materials and process for making such materials. In particular, the present invention relates to glass-ceramic materials comprising β-quartz or β-spodumene solid solution as the predominant crystalline phase, articles comprising such materials, and process of making such glass-ceramic materials and articles. The present invention is useful, for example, in making glass-ceramic material for use in cooktops, furnace windows and the like.

BACKGROUND OF THE INVENTION

Class-ceramic materials comprise crystalline phases and glassy phases. Due to the unique structures, they have exceptional physical properties, such as strength and coefficient of thermal expansion that enable them to be used in a wide range of products. A particularly interesting application of β-quartz and/or β-spodumene glass-ceramic material is in cooktop plates, fireplace windows and the like. A series of glass-ceramic cooktop plates and fireplace windows have been commercialized successfully.

The fabrication process of glass-ceramic material typically includes three steps: (i) melting of the precursor glass; (ii) forming the precursor glass into desired shapes; and (iii) heat-treating the shaped glass object to such that crystalline phases are formed in the glass article. The last step typically comprises two steps: (iii-a) treating the glass article at a relatively lower temperature where crystalline nuclei are allowed to form, which is typically termed the step of nucleating; and (iii-b) treating the glass article with nuclei at a higher temperature where the crystalline phase is allowed to grow to a desired extent.

As is typical in glass melting, in step (i), a fining agent is employed in making the precursor glass. Such fining agent releases gas at elevated temperature where the glass is melted and fined. The released gas facilitates the escaping of the gas bubbles which would otherwise be trapped inside the glass. Historically, $As_2O_3$ and/or $Sb_2O_3$ were used as effective fining agents. Due to increasing environmental concerns, $As_2O_3$ and $Sb_2O_3$ are to be phased out from such products in the near future. Therefore, there is the need of developing an alternative fining system that can effectively fine the glass during the glass melting step without significantly negatively impacting the forming step and the desired properties of the intended glass-ceramic articles and the fabrication process.

The present invention satisfies this need.

SUMMARY OF THE INVENTION

According to a first aspect of the present invention, provided is a glass-ceramic material containing a solid solution of β-quartz and/or β-spodumene, or both, as main crystalline phase(s), and essentially free of arsenic and antimony, characterized in that its composition, expressed in percentages by weight of oxides, comprises 0.15 to 0.3%, advantageously 0.15 to 0.25%, of $SnO_2$; and 0.7 to 1.5%, advantageously 0.8 to 1.5%, of $CeO_2$ and/or $MnO_2$.

According to certain embodiment of the glass-ceramic material of the present invention, it comprises both $SnO_2$ and $CeO_2$.

According to certain other embodiments of the glass-ceramic material of the present invention, it comprise both $SnO_2$ and $MnO_2$.

According to certain embodiments of the glass-ceramic material of the present invention, it has a composition, expressed in terms of weight percentage on an oxide basis, consisting essentially of: $SiO_2$ 50-75; $Al_2O_3$ 17-27; $Li_2O$ 2-6; MgO 0-5; ZnO 0-5; $TiO_2$ 0-5; $ZrO_2$ 0-5; BaO 0-3; SrO 0-3; CaO 0-3; $Na_2O$ 0-3; $K_2O$ 0-3; $P_2O_5$ 0-8; $B_2O_3$ 0-3; $SnO_2$ 0.15-0.3; $CeO_2$ and/or $MnO_2$ 0.7-1.5.

According to certain embodiments of the glass-ceramic material of the present invention, it has a composition, expressed in terms of weight percentage on an oxide basis, consisting essentially of: $SiO_2$ 65-70; $Al_2O_3$ 18-22; $Li_2O$ 2.5-4; MgO 0.5-2; ZnO 1-3; $TiO_2$ 1.5-3.5; $ZrO_2$ 0-2.5; BaO 0-2; SrO 0-2; CaO 0-2; $Na_2O$ 0-1; $K_2O$ 0-1.5; $P_2O_5$ 0-3; $SnO_2$ 0.15-0.25; $CeO_2$ and/or $MnO_2$ 0.7-1.5.

According to certain embodiments of the glass-ceramic material of the present invention, it has a composition, expressed in terms of weight percentage on an oxide basis, consisting essentially of: $SiO_2$ 65-70; $Al_2O_3$ 18-19.8; $Li_2O$ 2.5-3.8; MgO 0.55-1.5; ZnO 1.2-2.8; $TiO_2$ 1.8-3.2; BaO 0-1.4; SrO 0-1.4, with BaO+SrO 0.4-1.4, with MgO+BaO+SrO 1.1-2.3; $ZrO_2$ 1.0-2.5; $Na_2O$ 0-<1.0; $K_2O$ 0-<1.0, with $Na_2O+K_2O$, 0-<1.0, with $(2.8Li_2O+1.2ZnO)/5.2MgO$ >1.8; $SnO_2$ 0.15-0.3; $CeO_2$ and/or $MnO_2$ 0.7-1.5.

According to certain embodiments of the glass-ceramic material of the present invention, it has a composition, expressed in terms of weight percentage on an oxide basis, consisting essentially of: $SiO_2$ 65-70; $Al_2O_3$ 18-20.5; $Li_2O$ 2.5-3.8; MgO 0.55-1.5; ZnO 1.2-2.8; BaO 0-1.4; SrO 0-1.4, with BaO+SrO 0.4-1.4, with MgO+BaO+SrO 1.1-2.3; $Na_2O$ 0-<1.0; $K_2O$ 0-<1.0; $Na_2O+K_2O$ 0-<1.0; with $(2.8Li_2O+1.2ZnO)/5.2MgO$>1.8; $TiO_2$ 1.8-3.5; $ZrO_2$ 0.8-1.6, with $TiO_2/ZrO_2$>2.2; $SnO_2$ 0.15-0.3; $CeO_2$ and/or $MnO_2$ 0.7-1.5.

According to certain embodiments of the glass-ceramic material of the present invention, the composition of which further comprises an effective amount of at least one colorant, advantageously selected from CoO, $Cr_2O_3$, $Fe_2O_3$, NiO, CuO and $V_2O_5$.

A second aspect of the present invention involves a article made of the glass-ceramic material of the present invention described summarily supra and in detail infra, which is a cook-top, a cooking utensil, a microwave oven plate, a fireplace window, a fire-door, a fire-window, a pyrolysis- or catalysis-oven window.

A third aspect of the present invention involves the precursor glass of the glass-ceramic material described summarily supra and in detail infra.

A fourth aspect of the present invention is a process for making the glass-ceramic material of the present invention described summarily supra and in detail infra, which comprises heat-treating a lithium alumino-silicate glass, which is a precursor of such a glass-ceramic material, under conditions which ensure its ceramming, said glass containing, with the exception of inevitable traces, neither arsenic, nor antimony, characterized in that the composition of said glass, expressed in percentages by weight of oxides, comprises: 0.15-0.3%, advantageously 0.15 to 0.25%, of $SnO_2$; and 0.7 to 1.5%, advantageously 0.8 to 1.5%, of $CeO_2$ and/or $MnO_2$.

According to certain embodiments of the process of the present invention, it successively comprises the following steps:

melting a lithium alumino-silicate glass or an inorganic filler, which is a precursor of such a glass, said glass or said filler containing, with the exception of inevitable traces, neither arsenic, nor antimony and containing an effective and non-excess amount of at least one fining agent; followed by fining the molten glass obtained;

cooling the molten fined glass obtained and, simultaneously, shaping it into the shape desired for the article sought after;

ceramming said shaped glass, characterized in that the composition of said glass or said filler, expressed in percentages by weight of oxides, comprises 0.15% to 0.3%, advantageously 0.15 to 0.25%, of $SnO_2$; and 0.7% to 1.5%, advantageously 0.8 to 1.5%, of $CeO_2$ and/or $MnO_2$.

Certain embodiments of the process of the present invention are further characterized in that SnO2 and CeO2 and/or MnO2 are effectively used, in the indicated amounts, for fining the said precursor glass.

Certain embodiments of the process of the present invention are further characterized in that the composition of said glass or said filler comprises an effective amount of at least one metallic oxide-type colorant, the metal of which is able to exist under different valences, advantageously consisting in $V_2O_5$; and in that $SnO_2$ and $CeO_2$ and/or $MnO_2$ are effectively used, in the indicated amounts, for fining the said precursor glass and stabilizing the color of the glass-ceramic material during ageing.

A fifth aspect of the present invention relates to the use of $SnO_2$ in combination with $CeO_2$ and/or $MnO_2$, in the below amounts, expressed in percentages by weight of oxides of the composition of said glass, for the fining of a glass which is the precursor of a glass-ceramic material containing a solid solution of β-quartz or β-spodumene and, with the exception of inevitable traces, neither arsenic, nor antimony:

0.15 to 0.3%, advantageously 0.15 to 0.25% of $SnO_2$; and
0.7 to 1.5%, advantageously 0.8 to 1.5% of $CeO_2$ and/or $MnO_2$.

A sixth aspect of the present invention relates to the use of $SnO_2$ in combination with $CeO_2$ and/or $MnO_2$, in the below amounts expressed in percentages by weight of oxides of the composition of said glass:

0.15 to 0.3%, advantageously 0.15 to 0.25% of $SnO_2$; and
0.7 to 1.5%, advantageously 0.8 to 1.5% of $CeO_2$ and/or $MnO_2$, for:

(A) the fining of a glass which is the precursor glass of a glass-ceramic material containing (i) a solid solution of β-quartz or of β-spodumene; (ii) an effective amount of at least one metallic oxide-type colorant, the metal of which is able to exist under different valences; and (iii) with the exception of inevitable traces, neither arsenic, nor antimony, and containing advantageously consisting in $V_2O_5$; and (B) stabilizing the color of the glass-ceramic material obtained from said glass during ageing.

BRIEF DESCRIPTION OF THE DRAWINGS

The sole drawing, FIG. 1, is a diagram showing the light transmission curve of a series of glass-ceramic materials.

DETAILED DESCRIPTION OF THE INVENTION

The present invention has at its object:

novel glass-ceramic materials containing a solid solution of b-quartz or of β-spodumene (solid solutions of β-quartz and β-spodumene), as main crystalline phase(s);

articles made from said novel glass-ceramic materials;

lithium alumino-silicate glasses, precursors of such novel glass-ceramic materials;

methods of preparing the aforesaid novel glass-ceramic materials and the aforesaid articles made from said novel glass-ceramic materials.

The present invention also has at its object the use of a specific combination of compounds in the fining of a precursor glass, and even in the said fining and in the stabilization of the color in the ageing of the colored glass-ceramic material (by the action within of at least one metallic-oxide dye whose metal element is likely to exist with several valences, such as $V_2O_5$) obtained from such a glass.

Said present invention rests on the action, within compositions of the aforesaid glass-ceramic materials and glasses, of a specific combination of compounds to provide, in particular, the glass fining function.

Glass-ceramic materials which contain a solid solution of b-quartz or of β-spodumene (solid solutions of β-quartz and β-spodumene) as main crystalline phase(s) are materials known per se, obtained by heat treatment of glasses or mineral fillers. These materials are used in various contexts, notably as a substrate for cooktops and fire windows.

Transparent, opalescent, and even opaque glass ceramics are known in a variety of colors.

The manufacture of b-quartz and/or b-spodumene glass-ceramic articles classically includes three principal, successive steps:

a first step of melting an inorganic glass or a filler, a precursor of such a glass, generally performed at a temperature between 1,550 and 1,650° C., a second step of cooling and shaping the molten glass obtained, and a third step of crystallizing or ceramming the cooled, shaped glass by a suitable heat treatment.

Following the initial melting step, it is important to eliminate gaseous inclusions from the mass of molten glass as efficiently as possible. To this end at least one fining agent is used.

Arsenic oxide ($As_2O_3$) has generally been used in the methods hitherto, typically at greater than 0.1% and less than 1% by weight. Antimony oxide ($Sb_2O_3$) has also been used at higher ratios.

Given the toxicity of these products and the increasingly drastic regulations in effect (with respect to environmental safety and protection), avoidance of the use of these products is sought; other less-toxic, even non-toxic compounds to be used as fining agents are being researched.

For obvious reasons of economy, however, modification of current industrial methods is not desired. In particular, operation at higher temperature, with the implied increase in energy requirements and worsening of problems related to corrosion, is not desired.

Thus are sought compounds other than arsenic oxide and antimony oxide that, using the same methods, are effective as fining agents (substitutes for said oxides) for the glass which is to be cerammed.

Over and above its role as a fining agent, arsenic oxide can act to confer a color, generally dark, to the glass-ceramic materials which contain it. It acts, to this end, on the vanadium (a metallic element likely to exist under several valences) present. In precursor glass, the vanadium present—generally added at approximately 0.2% by weight—is mainly in an oxidized state ($V^{5+}$) and the aforesaid glass presents only weak coloring. During ceramming, arsenic reduces vanadium (in $V^{4+}$ and/or $V^{3+}$ form); this leads to strong absorption in the visible and near infrared ranges and in the end gives the glass-ceramic material a dark color. However, during ceramming, the reaction between arsenic and vanadium is never complete; the reaction tends to continue when the glass-ceramic material is later heated. Thus, a reduction in visible and infrared transmission is observed when the glass-ceramic material undergoes a process known as ageing for 100 h at 700° C. In view of the remarks above, it is sincerely hoped that the substitute compounds for arsenic oxide to be used as a glass fining agent do not interfere with obtaining, after ceramming, of the dark color, when it is desired, and it would be additionally advantageous if they ensure better stability of the aforesaid dark color from ageing.

Numerous documents of the prior art—JP 11 100 229, JP 11 100 230, DE 19 939787.2, WO 02/16279, EP 0 156 479, U.S. Pat. No. 5,446,008, U.S. Pat. No. 6,673,729, and EP 1 398 303—provide for the action of $SnO_2$ and $CeO_2$ separately ($SnO_2$ or $CeO_2$) or in combination ($SnO_2$ and $CeO_2$), as a fining agent for precursor glasses of glass-ceramic materials. The aforesaid documents do not, however, include a description of specific $SnO_2$ and $CeO_2$ combinations.

The use of $SnO_2$ (independently of $CeO_2$) was, on the other hand, expressly illustrated as a fining agent.

Patent applications JP 11 100 229 and 11 100 230 describe such a use of tin oxide ($SnO_2$), alone or in combination with chlorine (Cl), at a level of: $SnO_2$: 0.1-2% by weight; and Cl: 0-1% by weight.

Applications DE 19 939 787.2 and WO 02/16279 more particularly illustrate the use of tin oxide, acting at less than 1% by weight. The aforesaid documents describe glass fining conducted at temperatures greater than 1,700° C. and, in fact, no details regarding the performance of the fining obtained are included.

The inventor, confronted with this technical problem of providing fining agents to substitute for $As_2O_3$ and/or $Sb_2O_3$, studied the performance of $SnO_2$ and demonstrated that this compound is not, alone, completely satisfactory.

The efficiency of $SnO_2$, as a fining agent for precursor glasses of glass-ceramic materials, increases with the quantity of use of the aforesaid $SnO_2$. It is thus possible to obtain good results with respect to the fining of the aforesaid glasses, good results that are nearly comparable with those obtained to date with $As_2O_3$ in particular, by using adequate quantities of $SnO_2$. However, the action of these adequate, effective quantities from the point of view of fining is detrimental:

first, because of the low solubility of $SnO_2$ in glass. Problems of devitrification and difficulties of implementation of the melting are very quickly observed; and second, because of the reduction power of $SnO_2$. $SnO_2$ is likely to reduce transition metal oxides present in glass, in particular vanadium oxide, and thus to strongly influence the color of the ceramic concerned. In its presence, at quantities effective for fining precursor glass, the color of the final glass-ceramic material is difficult to control.

It is thus clear that it is not satisfactory to propose to use SnO2 as an effective fining agent instead of conventional fining agents ($As_2O_3$ and/or $Sb_2O_3$).

In the same way, the use of $CeO_2$ as a fining agent (independently of $SnO_2$, at from 0.2 to 1.3% by weight) has been expressly illustrated in application EP 0 156 479. The inventors have demonstrated that this oxide, used alone, is hardly effective.

Lastly, some documents of the prior art mention the use of $SnO_2$, $CeO_2$, and/or $MnO_2$, as dyes. U.S. Pat. No. 4,461,830 thus describes glass-ceramic materials containing $As_2O_3$ as a fining agent whose coloring filler is likely to contain $CeO_2$ (from 0 to 3% by weight) and $SnO_2$ (from 0 to 1.5% by weight). No example illustrates the joint action of $CeO_2$ and $SnO_2$.

The inventor deserves credit for having demonstrated, in such a context, the interest of specific "$SnO_2$+$CeO_2$ and/or $MnO_2$" combinations and for having observed, surprisingly, that such specific combinations are effective as a fining agent for precursor glass and as a stabilizer at ageing for the color of the colored glass-ceramic material obtained from such a glass. Within the aforesaid combinations, $SnO_2$ acts at low levels and thus the problems mentioned above are minimized or even avoided.

When added to a mixture of vitrifiable raw materials, $SnO_2$, $CeO_2$, and $MnO_2$ each tend to release oxygen when the temperature of the bath of glass increases, which a priori supports the fining phenomenon. The quantity of oxygen released and the temperature interval over which it is released depend on the redox equilibria established between the various multivalent elements present in the aforesaid bath of glass.

Surprisingly, it was observed that specific "$SnO_2$+$CeO_2$ and/or $MnO_2$" combinations of the invention are particularly effective.

Thus, the first object of the present invention relates to glass-ceramic materials containing a solid solution of b-quartz or of β-spodumene (solid solutions of β-quartz and β-spodumene) as main crystalline phase(s), and containing with the exception of inevitable traces, neither arsenic (As) nor antimony (Sb), whose composition, expressed in percentages by weight of oxides with respect to total weight, comprises:

0.15 to 0.3%, advantageously 0.15 to 0.25%, of $SnO_2$; and
0.7 to 1.5%, advantageously 0.8 to 1.5%, of $CeO_2$ and/or $MnO_2$.

The aforesaid glass-ceramic materials characteristically contain tin oxide in a non-excessive quantity (>0.3% by weight), in reference to the problems mentioned above. They also contain cerium oxide and/or manganese oxide in a non-excessive quantity (<1.5% by weight), mainly in reference to problems of coloring. They contain the aforesaid tin, cerium, and/or manganese oxides in the minimal quantities indicated ($SnO_2$: 0.15%; $CeO_2$ and/or $MnO_2$: 0.7%), in reference to the efficiency sought, mainly at the level of fining.

The aforesaid glass-ceramic materials contain these compounds in an original and characteristic way, in the quantities indicated, in reference to the technical problems described above, mainly that of the fining of glass precursors of the aforesaid glass-ceramic materials.

Within the glass-ceramic materials of the invention, $SnO_2$ and $CeO_2$, or $SnO_2$ and $MnO_2$ are advantageously found in the quantities indicated above.

Recommended "$SnO_2$+$CeO_2$ and/or $MnO_2$" combinations are effective and undoubtedly make it possible to dispense with the presence of the traditional, toxic fining agents ($As_2O_3$ and/or $Sb_2O_3$).

Within the glass-ceramic materials of the invention, $As_2O_3$ and/or $Sb_2O_3$ are not present, supposing that they are present, in effective quantities, in reference to the fining of precursor glasses of the aforesaid glass-ceramic materials. If As and/or Sb are present, they are as trace elements, in quantities generally lower than 200 ppm. The presence of such traces can not be excluded. The aforesaid traces come, for example, from impurities in the raw materials used. The specific details above are given in reference to the circumlocution "containing, with the exception of inevitable traces, neither arsenic nor antimony" used in the present description and the appended claims, to qualify glass-ceramic materials and their precursor glasses.

It may not, however, be excluded that the glass-ceramic materials of the invention contain others active compounds as a fining agent. It is only according to an advantageous embodiment that they do not contain such compounds.

Within the scope of another embodiment, independent of the preceding, the glass-ceramic materials of the invention do not contain fluorine.

Described below, in a way by no means restrictive, are glass-ceramic materials forming part of the first object of the invention whose composition, expressed in percentages of oxide weight, essentially consists of:

| | | |
|---|---|---|
| $SiO_2$ | 50-75, advantageously | 65-70 |
| $Al_2O_3$ | 17-27, advantageously | 18-22 |
| $Li_2O$ | 2-6, advantageously | 2.5-4 |
| MgO | 0-5, advantageously | 0.5-2 |
| ZnO | 0-5, advantageously | 1-3 |
| $TiO_2$ | 0-5, advantageously | 1.5-3.5 |
| $ZrO_2$ | 0-5, advantageously | 0-2.5 |
| BaO | 0-3, advantageously | 0-2 |
| SrO | 0-3, advantageously | 0-2 |
| CaO | 0-3, advantageously | 0-2 |
| $Na_2O$ | 0-3, advantageously | 0-1 |
| $K_2O$ | 0-3, advantageously | 0-1.5 |
| $P_2O_5$ | 0-8, advantageously | 0-3 |
| $B_2O_3$ | 0-3 | |
| $SnO_2$ | 0.15-0.3, advantageously | 0.15-0.25 |
| $CeO_2$ and/or $MnO_2$ | 0.7-1.5, advantageously | 0.8-1.5 |

The advantageous ranges indicated above are to be considered independently of one another and in combination with one another. Thus, the glass-ceramic materials of the invention advantageously present the weight composition indicated above in the rightmost column.

It has been indicated that the compositions in question "essentially consist of" the given list of oxides. This means that within the aforesaid compositions the sum of the listed oxides represents at least 95%, generally at least 98% by weight. Indeed, other elements such as lanthanum oxide, yttrium oxide, and dyes (see further), in small quantities, may be found within the aforesaid compositions.

Concerning the ranges indicated for the quantity of action of $SnO_2$ on one hand and $CeO_2$ and/or $MnO_2$ on the other, they are, in general, advantageously 0.15 to 0.25 and 0.8 to 1.5, respectively.

These three remarks are also applicable to the glass-ceramic material compositions below.

In application EP-A-0 437 228, the applicant described glass-ceramic materials with interesting properties, in particular rapid ceramming. Such glass-ceramic materials are advantageously related to the present invention. Thus are glass-ceramic materials also part of the first object of the invention whose composition expressed in percentages of oxide weight essentially consists of:

| | |
|---|---|
| $SiO_2$ | 65-70 |
| $Al_2O_3$ | 18-19.8 |
| $Li_2O$ | 2.5-3.8 |
| MgO | 0.55-1.5 |
| ZnO | 1.2-2.8 |
| $TiO_2$ | 1.8-3.2 |
| BaO | 0-1.4 |
| SrO | 0-1.4 |
| with BaO + SrO | 0.4-1.4 |
| with MgO + BaO + SrO | 1.1-2.3 |
| $ZrO_2$ | 1.0-2.5 |
| $Na_2O$ | 0-<1.0 |
| $K_2O$ | 0-<1.0 |
| with $Na_2O + K_2O$ | 0-<1.0 |
| With $(2.8 Li_2O + 1.2 ZnO)/5.2 MgO$ | >1.8 |

-continued

| | |
|---|---|
| $SnO_2$ | 0.15-0.3 |
| $CeO_2$ and/or $MnO_2$ | 0.7-1.5 |

In application EP-A-1 398 303, the applicant described glass-ceramic materials of the same type, improved in reference to the problem of devitrification. Such glass-ceramic materials are also related to the present invention. Thus are glass-ceramic materials also part of the first object of the invention whose composition expressed in percentages of oxide weight essentially consists of:

| | |
|---|---|
| $SiO_2$ | 65-70 |
| $Al_2O_3$ | 18-20.5 |
| $Li_2O$ | 2.5-3.8 |
| MgO | 0.55-1.5 |
| ZnO | 1.2-2.8 |
| BaO | 0-1.4 |
| SrO | 0-1.4 |
| BaO + SrO | 0.4-1.4 |
| MgO + BaO + SrO | 1.1-2.3 |
| $Na_2O$ | 0-<1 |
| $K_2O$ | 0-<1 |
| $Na_2O + K_2O$ | 0-<1 |
| $(2.8 Li_2O + 1.2 ZnO)/5.2 MgO$ | >1.8 |
| $TiO_2$ | 1.8-3.5 |
| $ZrO_2$ | 0.8-1.6 |
| $TiO_2/ZrO_2$ | >2.2 |
| $SnO_2$ | 0.15-0.3 |
| $CeO_2$ and/or $MnO_2$ | 0.7-1.5 |

As referred to above, the glass-ceramic materials of the invention are likely to contain dyes. Their composition is thus likely to contain an effective quantity (in reference to the coloring effect sought) of at least one dye. Said dye or dyes are advantageously selected from among CoO, $Cr_2O_3$, $Fe_2O_3$, NiO, CuO, and $V_2O_5$ (thus taken separately or in combination). Those skilled in the art are not unaware of that $V_2O_5$ (a metallic oxide dye whose metal element, vanadium, is likely to exist with several valences) is usually added to the mixture of raw materials to obtain dark glass-ceramic materials. Thus, glass-ceramic materials of the invention contain advantageously 0.03 to 0.15% vanadium oxide.

The second object of the present invention relates to glass-ceramic articles as described above, said glass-ceramic material containing jointly in its composition $SnO_2$ and $CeO_2$ and/or $MnO_2$ in the quantities specified above. The aforesaid articles can in particular consist of cook-tops, cooking utensils, microwave oven plates, fireplace windows, fire doors, fire windows, and pyrolysis- and catalysis-oven windows. Such a list is not exhaustive.

The third object of the present invention relates to lithium alumino-silicate glasses, which are precursors of glass-ceramic materials of the invention, such as described above. The lithium alumino-silicate glasses, which jointly contain $SnO_2$ and $CeO_2$ and/or $MnO_2$, in the quantities specified above, and which are precursors of the glass-ceramic materials of the invention, are in fact novel and therefore constitute the third object of the invention. Said novel glasses advantageously present a composition that corresponds to those specified above for the glass-ceramic materials of the invention.

The aforesaid novel glasses present a composition which contains, except for inevitable traces, neither arsenic nor antimony. Advantageously, the aforesaid novel glasses only contain as a fining agent the combination "$SnO_2+CeO_2$ and/or $MnO_2$" within the meaning of the invention.

The fourth object of the present invention relates to a method of preparing a glass-ceramic material of the invention, such as described above. Classically, said method comprises the heat treatment of a lithium alumino-silicate glass, which is a precursor of such a glass-ceramic material, under conditions which ensure its ceramming, the aforesaid glass containing, with the exception of inevitable traces, neither arsenic nor antimony. Such a ceramming treatment is known per se.

Characteristically, according to the invention, it is carried out on the aforesaid glass whose composition, expressed in percentages by weight of oxides with respect to total weight, comprises:

0.15 to 0.3%, advantageously 0.15 to 0.25%, of $SnO_2$; and
0.7 to 1.5%, advantageously 0.8 to 1.5%, of $CeO_2$ and/or $MnO_2$.

The glass-ceramic materials produced advantageously present a composition which corresponds to one of the compositions specified above for the glass-ceramic materials of the invention.

The fifth object of the present invention relates to a method of preparing an article made from a glass-ceramic material of the invention. The aforesaid method classically comprises three successive steps as follows:

the melting of a lithium alumino-silicate glass or a mineral filler, which is a precursor of such a glass, said glass or said filler containing, with the exception if inevitable traces, neither arsenic nor antimony, and containing an effective and non-excessive amount of at least one fining agent; followed by the fining the molten glass obtained;

the cooling of the molten fined glass obtained and, simultaneously, its shaping into the form desired for the article sought;

the ceramming of said shaped glass.

Characteristically, according to the invention, the aforesaid glass or the aforesaid filler in question presents a composition which contains jointly tin oxide and cerium oxide and/or manganese oxide in the quantities below, expressed in percentages by weight of oxides with respect to total weight:

0.15 to 0.3%, advantageously 0.15 to 0.25%, of $SnO_2$; and
0.7 to 1.5%, advantageously 0.8 to 1.5%, of $CeO_2$ and/or $MnO_2$.

The glass-ceramic material component of the article produced advantageously presents a composition which corresponds to one of the compositions specified above for glass-ceramic materials of the invention.

Within the scope of the methods above, $SnO_2$ and $CeO_2$ and/or $MnO_2$ act efficiently, in the quantities indicated, for the fining of precursor glass.

It was indicated in addition that specific "$SnO_2$ and $CeO_2$ and/or $MnO_2$" combinations described have a beneficial action on color stability (obtained by the action of at least one metallic oxide dye whose metallic element is likely to exist with several valences) at ageing of the glass-ceramic materials. Thus, according to a preferred embodiment of the methods above, the composition of glass or filler (precursor) includes an effective quantity of at least one metallic oxide dye whose metallic element is likely to exist with several valences (advantageously $V_2O_5$) and $SnO_2$ and $CeO_2$ and/or $MnO_2$ act efficiently in the quantities indicated for the simultaneous fining of precursor glass and the stabilization of the color of the glass-ceramic materials during ageing. $SnO_2$ and $CeO_2$ and/or $MnO_2$ act advantageously in the preparation of glass-ceramic material articles colored with vanadium, in the preparation of dark glass-ceramic plates, in particular, intended for cooking.

As has been specified above, the reduction in the transmission of glass-ceramic materials during the ageing process is related to the continuation of the reduction of vanadium. The inventor thus observed, within the scope of this invention, that the presence of manganese and/or cerium oxide limits the reduction of vanadium and consequently makes it possible to better control glass-ceramic coloring properties.

The invention, such as described above, can in addition be perfectly understood as a use invention. Thus it also has as an object:

the use of $SnO_2$ in combination with $CeO_2$ and/or $MnO_2$ in the following quantities, expressed in oxide percentages by weight of the composition of the aforesaid glass:

a. 0.15 to 0.3%, advantageously 0.15 to 0.25%, of $SnO_2$; and b. 0.7 to 1.5%, advantageously 0.8 to 1.5%, of $CeO_2$ and/or $MnO_2$:

for the fining of a glass, precursor of a glass-ceramic material containing a solid solution of b-quartz or of β-spodumene (solid solutions of β-quartz and β-spodumene) as main crystalline phase(s), (the aforesaid glass and thus the aforesaid glass-ceramic material) containing, except for inevitable traces, neither arsenic nor antimony;

the use of $SnO_2$ in combination with $CeO_2$ and/or $MnO_2$ in the following quantities expressed in oxide percentages by weight of the composition of the aforesaid glass:

a. 0.15 to 0.3%, advantageously 0.15 to 0.25%, of $SnO_2$ and b. 0.7 to 1.5%, advantageously 0.8 to 1.5%, of $CeO_2$ and/or $MnO_2$, for the fining of a glass which is the precursor of a glass-ceramic material containing (i) a solid solution of b-quartz or β-spodumene (solid solutions of β-quartz and βspodumene) as main crystalline phase(s); (ii) except for inevitable traces, neither arsenic nor antimony; and (iii) an effective quantity of at least one metallic oxide dye whose metallic element is likely to exist with several valences, consisting advantageously of $V_2O_5$; and additionally, for the stabilization of the color during ageing of the glass-ceramic materials obtained from said glass.

The invention will now be illustrated by the following examples.

More precisely, examples E, F, H and I illustrate the aforesaid invention while examples A, B, C, D and G are comparative examples.

I. Glass Fining

Table I below indicates:

in its first part, weight compositions of the glasses in question; and in its second part, the number of bubbles per cm3 of the aforesaid glasses.

Glasses were prepared in the usual way from oxides and/or easily decomposable compounds such as nitrates and carbonates. The raw materials are mixed to obtain a homogeneous mixture.

Approximately 800 g of raw materials were placed in silica crucibles. The crucibles were then introduced into a preheated furnace at 1,400° C. They then underwent the following melting cycle:

160 min from 1,400 to 1,600° C.,
100 min from 1,600 to 1,650° C.,
110 min at 1,650° C.

The glasses were then rolled to a thickness of 6 mm and then heated at 650° C. for 1 h. The number of bubbles was automatically counted by a camera coupled to an image analyzer.

Six batches were tested. They differ primarily by nature of the compound or compounds acting as a fining agent:
- the batch corresponding to example A contains arsenic oxide (AsO3: 0.6%) (and 0.2% of $V_2O_5$, as a dye);
- the batch corresponding to example B contains only tin oxide ($SnO_2$: 0.2%);
- the batch corresponding to example C contains only cerium oxide ($CeO_2$: 1%);
- the batch corresponding to example D contains tin oxide ($SnO_2$: 0.2%) and cerium oxide ($CeO_2$: 0.5%);
- the batch corresponding to example E contains tin oxide ($SnO_2$: 0.2%) and cerium oxide ($CeO_2$: 1%);
- the batch corresponding to example F contains tin oxide ($SnO_2$: 0.2%) and manganese oxide ($MnO_2$: 1%).

Batches E and F illustrate the invention.

The melting cycle is short in order to generate sufficient bubbles for the purpose of differentiating the fining performances of the various products tested ($As_2O_3$, $SnO_2$, $CeO_2$, $SnO_2+CeO_2$, $SnO_2+MnO_2$). It can be estimated that the glass obtained from this test with fewer than 400 bubbles/cm$^3$ can be produced on an industrial scale with sufficient quality.

TABLE 1

| Composition (% by weight) | Examples | | | | | |
| --- | --- | --- | --- | --- | --- | --- |
|  | A | B | C | D | E | F |
| $SiO_2$ | 68.50 | 69.03 | 68.20 | 68.53 | 68.03 | 68.03 |
| $Al_2O_3$ | 19.3 | 19.3 | 19.3 | 19.3 | 19.3 | 19.3 |
| $Li_2O$ | 3.5 | 3.5 | 3.5 | 3.5 | 3.5 | 3.5 |
| MgO | 1.1 | 1.1 | 1.1 | 1.1 | 1.1 | 1.1 |
| ZnO | 1.6 | 1.6 | 1.6 | 1.6 | 1.6 | 1.6 |
| $TiO_2$ | 2.6 | 2.6 | 2.6 | 2.6 | 2.6 | 2.6 |
| $ZrO_2$ | 1.8 | 1.8 | 1.8 | 1.8 | 1.8 | 1.8 |
| BaO | 0.8 | 0.8 | 0.8 | 0.8 | 0.8 | 0.8 |
| $SnO_2$ |  | 0.2 |  | 0.2 | 0.2 | 0.2 |
| $MnO_2$ |  |  |  |  |  | 1 |
| $CeO_2$ |  |  | 1 | 0.5 | 1 |  |
| $As_2O_3$ | 0.6 |  |  |  |  |  |
| $V_2O_5$ | 0.2 | 0.07 | 0.1 | 0.07 | 0.07 | 0.07 |
| Number of bubbles/cm$^3$ | 110 | 720 | 1,270 | 790 | 365 | 350 |

The tests clearly show that $SnO_2$ and $CeO_2$, alone, at the quantities indicated (0.2 and 1% by weight, respectively), are much less effective as a glass fining agent than $As_2O_3$ used in the quantity indicated. The combination $SnO_2+CeO_2$ with 0.2% $SnO_2$ and 0.5% $CeO_2$ is not much more effective. Surprisingly, the combinations $SnO_2+CeO_2$ and $SnO_2+MnO_2$ used in batches E and F give satisfactory results.

II. Glass Fining and Ceramming

Below is demonstrated that fining according to the invention does not significantly modify the properties (thermal dilation, color and transmission) of prepared glass-ceramic materials and that, on the contrary, a positive effect on ageing is observed.

Glasses were prepared (prior art and invention) and cerammed; the properties of the ceramics obtained were then measured (following ceramming and after ageing).

The raw materials were brought to 1,500° C. then melting was performed at 1,650° C. for 6 h. The glass was rolled to a thickness of 6 mm and reheated at 650° C. for 1 h.

The pieces of glass were cerammed in a static oven according to the following heating schedule:

20 min from ambient temperature to 600° C.,
45 min from 600 to 820° C.,
20 min from 820 to 930° C.,
15 min at 930° C.

Following ceramming, measurements were taken of the thermal expansion coefficient, integrated transmission Y, and transmission at 1,050 nm. The transmissions were measured on a sample 3 mm in thickness. Y was measured using D65 illumination.

Ageing is performed for 100 h at 700° C. in a static oven. After the aforesaid ageing, the thermal expansion coefficient, integrated transmission Y, and transmission at 1,050 nm are again measured.

The compositions of glasses and glass-ceramic materials as well as the properties of the aforesaid glass-ceramic materials are given in Table 2 below.

TABLE 2

| | Examples | | |
| --- | --- | --- | --- |
| | G | H | I |
| Composition (% by weight) | | | |
| $SiO_2$ | 69.54 | 69.23 | 68.63 |
| $Al_2O_3$ | 19.4 | 18.5 | 18.8 |
| $Li_2O$ | 3.6 | 3.4 | 3.5 |
| MgO | 1.1 | 1 | 1.1 |
| ZnO | 1.7 | 1.5 | 1.5 |
| $TiO_2$ | 2.5 | 2.6 | 2.7 |
| $ZrO_2$ | 1.9 | 1.7 | 1.7 |
| BaO |  | 0.8 | 0.8 |
| $SnO_2$ | 0.2 | 0.2 | 0.2 |
| $MnO_2$ |  |  | 1 |
| $CeO_2$ |  | 1 |  |
| $V_2O_5$ | 0.06 | 0.07 | 0.07 |
| After ceramming | | | |
| Expansion (25-700° C.) ($\times 10^{-7} K^{-1}$) |  | 0.3 | 1.1 |
| Y | 3.7 | 4.4 | 1.4 |
| T @ 1,050 nm (%) | 74.9 | 76 | 73 |
| After ceramming and curing | | | |
| Expansion (25-700° C.) ($\times 10^{-7} K^{-1}$) |  | 0.3 | 1.2 |
| Y | 2.3 | 4.4 | 1.2 |
| T @ 1,050 nm (%) | 74.7 | 76.7 | 73 |

The sample in example G (prior art) contains only tin oxide ($SnO_2$), while those in examples H and I (invention) contain $SnO_2+CeO_2$ and $SnO_2+MnO_2$, respectively, in adequate quantities as a fining agent.

After ageing, the parameter "integrated transmission Y" decreased significantly in example G. In examples H and I, the observed reduction is less. For the aforesaid examples H and I, ageing deteriorates neither integrated transmission Y nor transmission at 1,050 nm.

Appended FIG. 1, which shows the transmission curves (T=f($l$)) of the products according to examples G (prior art) and H (invention), can also be considered. Actually, transmission as a function of wavelength was measured on samples 0.5 mm in thickness after ceramming (G', H') and after ceramming and ageing (G'', H'').

For the sample in example G, which does not contain $CeO_2$, the G' and G'' curves present a valley between 400 and 500 nm. Absorption increases in this region with ageing. This absorption is attributed to the presence of vanadium in its most reduced form (V3+) (see "Optical Spectra of the various valence states of Vanadium in $Na_2O$. $SiO_2$ glass" by W. D. Johnston, Journal of the America Ceramic Society (48)12, p 608-610).

For the sample in example H, which contains $SnO_2+CeO_2$, such a valley neither exists for the H' curve (before ageing: after ceramming) nor for the H" curve (after ceramming and ageing). From this it can be deduced that the presence of cerium limits the reduction of vanadium by tin and thus leads to the formation of a smaller quantity of $V3+$, whether during ceramming or ageing.

What is claimed is:

1. A glass-ceramic material containing a solid solution of β-quartz and/or of β-spodumene as main crystalline phase(s) and essentially free of arsenic and antimony, wherein its composition, expressed in percentages by weight of oxides, comprises 0.15 to 0.3% of $SnO_2$; and 0.7-1.5% of $CeO_2$ and/or $MnO_2$.

2. The glass-ceramic material according to claim 1, the composition of which, expressed in percentages by weight of oxides, essentially consists of: $SiO_2$ 50-75; $Al_2O_3$ 17-27; $Li_2O$ 2-6; MgO 0-5; ZnO 0-5; $TiO_2$ 0-5; $ZrO_2$ 0-5; BaO 0-3; SrO 0-3; CaO 0-3; $Na_2O$ 0-3; $K_2O$ 0-3; $P_2O_5$ 0-8; $B_2O_3$ 0-3; $SnO_2$ 0.15-0.3; $CeO_2$ and/or $MnO_2$ 0.7-1.5.

3. The glass-ceramic material according to claim 1, the composition of which, expressed in percentages by weight of oxides, essentially consists of: $SiO_2$ 65-70; $Al_2O_3$ 18-22; $Li_2O$ 2.5-4; MgO 0,5-2; ZnO 1-3; $TiO_2$ 1.5-3.5; $ZrO_2$ 0-2.5; BaO 0-2; SrO 0-2; CaO 0-2; $Na_2O$ 0-1; $K_2O$ 0-1.5; $P_2O_5$ 0-3; $SnO_2$ 0.15-0.25; $CeO_2$ and/or $MnO_2$ 0.7-1.5.

4. The glass-ceramic material according to claim 1, the composition of which, expressed in percentages by weight of oxides, essentially consists of: $SiO_2$ 65-70; $Al_2O_3$ 18-19.8; $Li_2O$ 2.5-3.8; MgO 0.55-1.5; ZnO 1.2-2.8; $TiO_2$ 1.8-3.2; BaO 0-1.4; SrO 0-1.4, with BaO+SrO 0.4-1.4, with MgO+BaO+SrO 1.1-2.3; $ZrO_2$ 1.0-2.5; $Na_2O$ 0-<1.0; $K_2O$ 0-<1.0, with $Na_2O+K_2O$ 0-<1.0, with $(2.8Li_2O+1.2ZnO)/5.2MgO>1.8$; $SnO_2$ 0.15-0.3; $CeO_2$ and/or $MnO_2$ 0.7-1.5.

5. The glass-ceramic material according to claim 1, the composition of which, expressed in percentages by weight of oxides, essentially consists of: $SiO_2$ 65-70; $Al_2O_3$ 18-20.5; $Li_2O$ 2.5-3.8; MgO 0.55-1.5; ZnO 1.2-2.8; BaO 0-1.4; SrO 0-1.4, with BaO+SrO 0.4-1.4, with MgO+BaO+SrO 1.1-2.3; $Na_2O$ 0-<1.0; $K_2O$ 0-<1.0; $Na_2O$ +$K_2O$ 0-<1.0; with $(2.8Li_2O+1.2ZnO)/5.2MgO>1.8$; $TiO_2$ 1.8-3.5; $ZrO_2$ 0.8-1.6, with $TiO_2/ZrO_2>2.2$; $SnO_2$ 0.15-0.3; $CeO_2$ and/or $MnO_2$ 0.7-1.5.

6. The glass-ceramic material according to claim 1, the composition of which further comprises an effective amount of at least one colorant selected from the group consisting of CoO, $Cr_2O_3$, $Fe_2O_3$, NiO, CuO and $V_2O_5$.

7. The glass-ceramic material according to claim 1, wherein the composition comprises 0.15-0.25% of $SnO_2$.

8. The glass-ceramic material according to claim 1, wherein the composition comprises 0.8-1.5% of $CeO_2$ and/or $MnO_2$.

* * * * *